United States Patent Office 3,318,970
Patented May 9, 1967

3,318,970
FORMALDEHYDE POLYMER STABILIZED BY A POLY(ACETAL-AMIDE)
Richard Green, Livingston, N.J., assignor to Tenneco Chemicals, Inc., a corporation of Delaware
No Drawing. Filed Aug. 6, 1964, Ser. No. 388,006
12 Claims. (Cl. 260—823)

This invention relates to the stabilization of polyacetals and, more particularly, to the stabilization of high molecular weight polymers of formaldehyde. The invention provides an improved thermally stable polyacetal composition and is based on the discovery that certain poly(amide-acetals), when incorporated into high molecular weight polymers of formaldehyde, particularly in conjunction with other stabilizers, are remarkably effective for improving the thermal stability of the formaldehyde polymers.

Recent advances in polymer process technology have made commercially available high molecular weight polyacetal resins. These polyacetal resins, which include both the homopolymers and copolymers of formaldehyde, are thermoplastic resins which upon stabilization, may be fabricated into films, filaments, fibers, rods, and tubes. Because of the inherent instability of unstabilized polyacetals (such as polyoxymethylene glycol) to oxidative or hydrolytic cleavage of the polymer chains or to thermal degradation, generally the raw "uncapped" polymers require stabilization, either by the further reaction of an "uncapped" polymer by acylation, etherification, cyanaethylation, or cross-linking to block the "uncapped" hydroxyl groups to more stable groups, by controlled degradation of the polymer chain until an end group is reached which is inert to further chemical or physical degradation by the incorporation in the polymer composition of a stabilizer or stabilizer system which promotes the stabilization of the polymer against oxidative, hydrolytic, or thermal degradation, or by employing a combination of these techniques.

Using a large number of high molecular weight polymers of formaldehyde, including both linear and branched-chain homopolymers and copolymers as well as the "capped" and "uncapped" analogs of these polymers, I have found in all instances that the incorporation (or admixture) in the formaldehyde polymer of a poly(amide-acetal) having a melting point in the range from about 150° C. to about 200° C. and a molecular weight in the range from about 1,000 to about 10,000 is remarkably effective for improving the thermal stability of the formaldehyde polymer. Moreover, when the poly(amide-acetal) is employed in the formaldehyde polymer with other stabilizers, such as phenolic antioxidants, then the stability of the resultant polyacetal composition is much greater than can be obtained when any of these stabilizers is employed by itself. Based on the results of an extensive series of experiments, it appears that stabilizer systems containing poly(amide-acetals) may be used to stabilize any polyacetal composition containing a high molecular weight polymer of formaldehyde.

As used herein, the term "high molecular weight polymer of formaldehyde" includes linear, branched-chain, and cross-linked homopolymers and copolymers of formaldehyde having a molecular weight in the range from about 10,000 to about 200,000 and a melting point above 170° C., the predominant structural feature of both homopolymers and copolymers being the recurring oxymethylene units (—OCH$_2$—) in the polymer chain. Among the most important of the homopolymers are α,ω-polyoxymethylene glycol, α,ω-polyoxymethylene carboxylates (such as the diacetate or dipropionate), and α,ω-polyoxymethylene diethers (such as the methyl, ethyl, or β-hydroxyethyl ether), each of which may have branches which comprise ω-substituted polyoxymethylene chains at one or more points in the main polymer chain. The formaldehyde copolymers include linear, branched-chain, and cross-linked polymers in which the recurring oxymethylene units (—OCH$_2$—) in the polymer chains are periodically or randomly interrupted by other oxyalkylene units containing two or more vicinal carbon atoms or by other units introduced by copolymerizing other monomers, such as γ-butyrolactone, phthalide, or isocyanic acid, with substantially anhydrous formaldehyde or with its cyclic trimer, trioxane. The formaldehyde polymers also include linear and branched-chain terpolymers, such as those obtained by polymerizing trioxane with both a monocyclic ether (1,3-dioxolane) and a dicyclic ether (pentaerythritol diformal) or other terpolymers.

The poly(amide-acetals) which are used to stabilize high molecular weight polymers of formaldehyde in accordance with the invention possess melting points in the range from about 150° C. to about 200° C. and have a molecular weight in the range from about 1,000 to about 10,000. These poly(amide-acetals) are polyamides which contain one or more acetal units interposed in the polymer chain. Among the poly(amide-acetals) which have been used successfully to stabilize formaldehyde polymers are those poly(amide-acetals) containing the following unit:

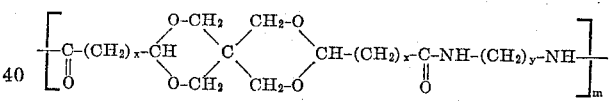

in which each $x$ represents an integer in the range from 4 to 16, $y$ represents an integer in the range from 2 to 12, and $m$ represents an integer in the range from 1 to 10. These poly(amide-acetals) may be conveniently prepared by condensing a 3,9-bis-(ω-carboxyalkylene)-2,4,8,10-tetraoxaspiro-[5,5]-undecane (or one of its lower alkyl esters) with an alkylene diamine, as illustrated by the following equation:

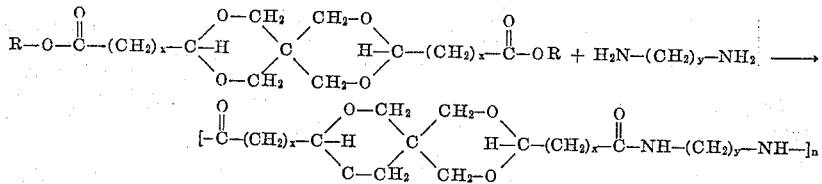

In the foregoing equation, each R represents hydrogen or an alkyl group having from 1 to 6 carbon atoms, $x$ and $y$ are integers having the aforementioned values, and $n$ is an integer in the range of approximately 3 to 30. Those poly(amide-acetals) in which each $x$ is 7 and $y$ is 6 have been found to be especially effective as stabilizers for polyacetal resins.

The 3,9-bis-(ω-carboxyalkylene)-2,4,8,10-tetra-oxaspiro-[5,5]-undecanes which are used as the starting material in the preparation of these poly(amide-acetals) may be prepared by reacting pentaerythritol and a dimethyl acetal of a dialdehyde in accordance with the procedure described in the article by Pryde et al., Journal of Polymer Science, 58, 1 (1962). The preparation of poly(amide-acetals) from these 3,9-bis-(ω-carboxyalkylene)-2,4,8,10-tetraoxaspiro-[5,5]-undecanes, in turn, is readily accomplished by heating the cyclic acetal-dicarboxylic acid or one of its lower alkyl esters with an alkylene diamine having from 2 to 12 carbon atoms (e.g., ethylene diamine, hexamethylene diamine, or dodecylene diamine) at a temperature in the range of about 150° C. to about 300° C. at atmospheric, subatmospheric, or superatmospheric pressure until a poly(amide-acetal) having the desired degree of polymerization is obtained. While substantially equivalent amounts of the cyclic acetal-dicarboxylic acid or its ester and the diamine are ordinarily used, a small excess, generally not more than 10 percent by weight, of either component can be used if desired.

The properties of these poly(amide-acetals) may be modified by substituting for a portion of the aforementioned cyclic acetal-dicarboxylic acid component an equivalent amount of a dicarboxylic acid (or diester) compound having the structural formula

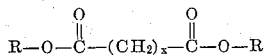

in which each R and the x have the aforementioned significance. Preferably, these dicarboxylic acids (or diesters), if used, should be azelaic acid or dimethyl azelate for best results. In most cases, the cyclic acetal-dicarboxylic acid and the linear dicarboxylic acid starting materials are present in the reaction mixture in molar ratios of from approximately 1:10 to 10:1.

While the properties of the poly(amide-acetals) are dependent upon the choice of reactants and the relative amount of each reactant that is used, these resinous products generally have melting points in the range of 150° C. to 200° C. and have molecular weights between 1,000 and 10,000. Table I sets forth the properties of a number of poly(amide-acetals) which have been used successfully to stabilize polyacetals in accordance with the invention. Included are a series of products prepared from 3,9-bis-(7-carbomethoxyheptyl) - 2,4,8,10-tetraoxaspiro-[5,5]-undecane ("Compound A"), dimethyl azelate ("Compound B"), and hexamethylene diamine, as well as one polymer in which Compound A was the sole dicarboxylic acid component used to prepare the poly(amide-acetal).

Table I.—Properties of poly(amide-acetals)

| Molar Ratio of Compound A to Compound B in Poly(amide-acetal) | Melting Point of Poly-(amide-acetal) | Molecular Weight of Poly-(amide-acetal) |
|---|---|---|
| 10:90 | 198–199 | 3,620 |
| 20:80 | 185–187 | 5,260 |
| 35:65 | 173–177 | 2,000 |
| 50:50 | 161–163 | 5,525 |
| 75:25 | 162–165 | 7,800 |
| 100:0 | 160–163 | 3,030 |

Only very small amounts of the poly(amide-acetal) are required to stabilize the formaldehyde polymer, for concentrations as low as 0.1 percent by weight (based on the weight of the formaldehyde polymer) have been found to be effective. There appears to be no useful advantage in using more than about 30 percent by weight of the poly-(amide-acetal) stabilizer, and in general concentrations in the range from about 0.5 percent to about 20 percent by weight, based on the weight of the formaldehyde polymer, are sufficient to stabilize most high molecular weight polymers of formaldehyde.

Accordingly, the invention provides an improved thermally stable polyacetal composition comprising a high molecular weight polymer of formaldehyde having a molecular weight in the range from about 10,000 to about 200,000 and a melting point above 170° C. and containing a stabilizer system comprising from about 0.1 to about 30 percent by weight, based on the weight of the formaldehyde polymer, of a poly(amide-acetal) having a melting point in the range from about 150° C. to about 200° C. and a molecular weight in the range from about 1,000 to about 10,000. In the preferred embodiment of the invention, the poly(amide-acetals) are those polymers which are formed by reacting (i) a cyclic acetal having the structural formula

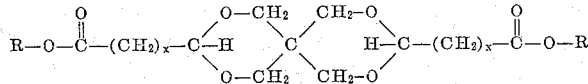

wherein each R represents hydrogen or an alkyl group having from 1 to 6 carbon atoms and each x represents an integer in the range of 4 to 16, and (ii) an alkylene diamine having from 2 to 12 carbon atoms.

Although poly(amide-acetals) may be used as the sole stabilizer in a polyacetal composition in accordance with the invention, their effectiveness is even more pronounced when these polymers are used in a stabilizer system which also contains an antioxidant. Suitable antioxidants include monocyclic phenols, such as hydroquinone and N-acyl-p-aminophenols, and alkylene-bis-phenols. Best results have been obtained by using stabilizer systems containing the poly(amide-acetal) together with an alkylene-bis-phenol having the structural formula

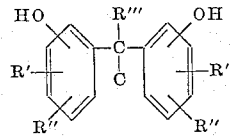

in which R' and R'' each represents an alkyl group having from 1 to 4 carbon atoms, and R''' represents hydrogen or an alkyl group having from 1 to 3 carbon atoms. Among the many phenolic antioxidants which may be used in a stabilizer system together with the poly(amide-acetals) in accordance with the invention are 2,2'-methylene-bis-(4-methyl-6-tert. butylphenol), 6,6'-methylene-bis-(3,4-xylenol), 2,2'-methylene-bis-(4-ethyl - 6 - tert. butylphenol), 4,4'-methylene-bis-(2,6-di-tert. butylphenol), 6,6'-ethylidene-bis-(2,4-xylenol), 4,4'-ethylidene-bis-(2,5-xylenol), 2,2'-ethylidene-bis-(4-methyl - 6 - tert. butylphenol), 6,6'-propylidene-bis-(2,4-xylenol), 4,4'-butylidene-bis-(3-methyl-6-tert. butylphenol), 6,6'-butylidene-bis-(2,4-xylenol), 2,2'-butylidine-bis-(4-tert. butyl-6-methylphenol), and 4,4'-butylidene-bis-(2,5-xylenol). When used, the concentration of the antioxidant should be in the range from about 0.01 to about 10 percent by weight, based on the weight of the formaldehyde polymer and preferably in the range from about 0.1 to 0.5 percent by weight based on the weight of the formaldehyde polymer.

The optimum concentration ranges which are described above for the components of the stabilizer system have been found to be effective for enhancing the thermal stability of those high molecular weight polymers of formaldehyde in which they were tested. It should be realized, however, that the amount of each component that is used in the stabilizer system is dependent to a large extent upon the structure and chemical composition of the formaldehyde polymer. For example, if the formaldehyde polymer has been chemically stabilized by acetylation, etherification, or other reaction, a lower concentration of the stabilizer system may be used. Regardless of the degree of chemical stabilization of the formaldehyde polymer, the stabilizer system of the present invention may be used to improve the thermal stability of the resulting polyacetal composition whether or not the formaldehyde polymer has been stabilized by "capping" or partial depolymerization to more stable end groups.

The stabilizer system may be incorporated in the polyacetal compositions of this invention by any convenient procedure. For example, solutions of the stabilizer components in a volatile solvent, such as a ketone, lower alkanol, or chlorinated hydrocarbon, or a single solution containing both components can be added to the formaldehyde polymer in the amount that will provide the desired amounts of the stabilizer components in the polyacetal composition, and the solvent removed by evaporation. Alternatively, the stabilized compositions can be prepared by milling the stabilizer components with the formaldehyde polymer or by dissolving both the stabilizer components and the formaldehyde polymer in a common solvent and then removing the solvent by evaporation.

In addition to the formaldehyde polymer, poly(amide-acetal), and an antioxidant, the polyacetal composition may also include plasticizers, fillers, pigments, and other stabilizers, such as benzophenone derivatives which stabilize the polymer against degradation or discoloration by ultraviolet light.

The following examples are illustrative of the effectiveness with which poly(amide-acetals) may be incorporated in high molecular weight polymers of formaldehyde either by themselves or in stabilizer systems containing other additives to prepare the thermally stable polyacetal compositions of the invention:

EXAMPLE I 3,9-bis-(7-carbomethoxyheptyl) - 2,4,8,10 - tetraoxaspiro-[5,5]-undecane (4 grams, 0.008 mole), dimethyl azelate (17 grams, 0.08 mole), and hexamethylene diamine (10.4 gram 0.09 mole) were heated for four hours at 265–270° C. in an atmosphere of nitrogen and then for an additional four hours at 270° C. and 19 mm. Hg, yielding a white polymeric product which was a hard, brittle solid that melted at 198°–199° C. End-group analysis by the procedure described by G. F. Price in "Techniques of Polymer Characterization," P. W. Allen, Ed., Butterworths, London, 1959, Chapter 7, indicated an amine content of $5.27 \times 10^{-4}$ equivalent per gram and a carbomethoxyl content of $0.24 \times 10^{-4}$ equivalent per gram, which correspond to a molecular weight of 3620 and about 12 repeating units.

EXAMPLE II 3,9-bis-(7-carbomethoxyheptyl) - 2,4,8,10 - tetraoxaspiro-[5,5]-undecane (22.5) grams, 0.045 mole), dimethyl azelate (7.6 grams, 0.045 mole), and hexamethylene diamine (10.4 grams, 0.09 mole) were heated for seven hours at 160–204° C. in an atmosphere of nitrogen and then for an additional 2.5 hours at 197°–204° C. and 0.6 mm. Hg. The white polymeric product was a hard, brittle solid that melted at 161–163° C. End-group analysis indicated an amine content of $3.33 \times 10^{-4}$ equivalent per gram and a carbomethoxyl content of $0.30 \times 10^{-4}$ equivalent per gram, which correspond to a molecular weight of 5525 and about 14 repeating units.

EXAMPLE III

Stabilized polyacetal compositions were prepared by the following procedure: To one part by weight of a polyoxymethylene polyacetate having an average molecular weight of approximately 30,000 as determined by viscometric techniques was added two parts by weight of a 1 percent solution in acetone of one of the poly(amide-acetals) described above. The resulting polyacetal composition was air-dried to remove the acetone, and the thermal stability rating of the composition was then determined by measuring the weight loss that the stabilized polyacetal composition underwent on being heated in an oxidizing atmosphere for 30 minutes at 222° C. The results of these tests are summarized in Table II.

Table II.—Thermal stability ratings of polyoxymethylene polyacetate compositions containing 2% by weight of a poly(amide-acetal)

| Example | Stabilizer | Percent Loss In Weight of Stabilized Polymer |
|---|---|---|
| 3A | Poly(amide-acetal) of Example I | 22.5 |
| 3B | Poly(amide-acetal) of Example II | 19.7 |
| 3C | None | 33.4 |

EXAMPLE IV

A series of polyacetal compositions was prepared by the following procedure: To one part by weight of a polyoxymethylene polyacetate having an average molecular weight of approximately 38,000 as determined by viscometric techniques was added 1.5 parts by weight of a 1 percent solution in acetone of one of the poly(amide-acetals) described in Examples I and II and 0.3 part by weight of a 1 percent solution in acetone of 4,4-butylidene-bis-(3-methyl-6-tert. butylphenol). After air drying, the thermal stability ratings of the resultant polyacetal compositions were determined by the procedure set forth in Example III; the results of these tests are summarized in Table III.

Table III.—Thermal stability ratings of polyoxymethylene polyacetate compositions containing 1.5% by weight of a poly(amide-acetal) and 0.3% by weight of 4,4-butylidene-bis-(3-methyl-6-tert. butylphenol)

| Example | Poly(amide-acetal) | Percent Loss In Weight of Stabilized Polymer |
|---|---|---|
| 4A | Poly(amide-acetal) of Example I | 3.0 |
| 4B | Poly(amide-acetal) of Example II | 2.8 |
| 4C | None | 17.6 |

These examples illustrate the effectiveness with which polyoxymethylene polyacetates may be stabilized with poly(amide-acetals) which have been used alone and in combination with antioxidants. Equally satisfactory results may be obtained in the stabilization of other high molecular weight polymers of formaldehyde, such as the copolymers and terpolymers of trioxane and cyclic ethers, and consequently the invention is applicable to the stabilization of any high molecular weight polymer of formaldehyde with a poly(amide-acetal).

I claim:

1. A thermally stable polyacetal composition comprising a high molecular weight polymer of formaldehyde having a molecular weight in the range from about 10,000 to about 200,000 and a melting point in excess of 170° C. and containing a stabilizer system comprising from about 0.1 to 30 percent, based on the weight of the formaldehyde polymer in the polyacetal composition, of a poly-(amide-acetal) having a melting point in the range from about 150° C. to about 200° C. and a molecular weight in the range from about 1,000 to about 10,000 and containing a recurring unit having the structure

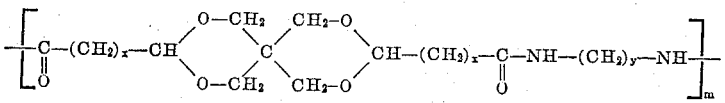

in which each $x$ represents an integer in the range from 4 to 16, $y$ represents an integer in the range from 2 to 12, and $m$ represents an integer in the range from 1 to 10.

2. A thermally stable polyacetal composition comprising a high molecular weight polymer of formaldehyde having a molecular weight in the range from about 10,000 to about 200,000 and a melting point in excess of 170° C. and containing a stabilizer system comprising from about 0.1 to about 30 percent, based on the weight of the formaldehyde polymer in the polyacetal composition, of a poly(amide-acetal) having a melting point in the range of approximately 150° C. to 200° C. and a molecular weight in the range of 1,000 to 10,000, said poly(amide-acetal) being the polymeric product formed by reacting approximately stoichiometrically equivalent amounts of (a) a cyclic acetal having the structural formula

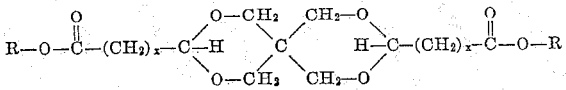

in which each R represents a member selected from the group consisting of hydrogen and alkyl groups having from 1 to 6 carbon atoms and each $x$ represents an integer in the range of 4 to 16, with (b) an alkylene diamine having from 2 to 12 carbon atoms.

3. A thermally stable polyacetal composition comprising a high molecular weight polymer of formaldehyde having a molecular weight in the range from about 10,000 to about 200,000 and a melting point in excess of 170° C. and containing a stabilizer system comprising from about 0.1 to about 30 percent, based on the weight of the formaldehyde polymer in the polyacetal composition, of a poly(amide-acetal) having a melting point in the range from about 150° C. to about 200° C. and a molecular weight in the range from about 1,000 to about 10,000, said poly(amide-acetal) being the polymeric product formed by reacting (a) a mixture of a cyclic acetal having the structural formula

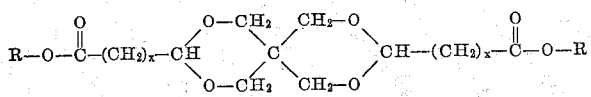

and a dicarboxylic acid compound having the structural formula

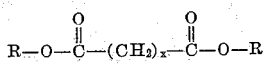

in both of which formulas R represents a member selected from the group consisting of hydrogen and alkyl groups having from 1 to 6 carbon atoms, and $x$ is an integer from 4 to 16, the mole ratio of cyclic acid to dicarboxylic acid compound in the mixture being in the range from about 1:10 to about 10:1, together with approximately stoichiometrically equivalent amounts of (b) an alkylene diamine having from 2 to 12 carbon atoms.

4. A thermally stable polyacetal composition comprising a high molecular weight polymer of formaldehyde having a molecular weight in the range from about 10,000 to about 200,000 and a melting point in excess of 170° C. and containing a stabilizer system comprising from about 0.1 to about 30 percent, based on the weight of the formaldehyde polymer in the polyacetal composition, of a poly(amide-acetal) having a melting point in the range from about 150° C. to about 200° C. and a molecular weight in the range from about 1,000 to about 10,000, said poly(amide-acetal) being the polymeric product formed by reacting (a) a mixture of 3,9-bis-(7-carbomethoxyheptyl)-2,4,8,10-tetraoxaspiro[5,5]-undecane and dimethyl azelate in which the mole ratio of the cyclic acetal to dimethyl azelate is in the range from about 1:10 to about 10:1, together with approximately a stoichiometrically equivalent amount of (b) an alkylene diamine having from 2 to 12 carbon atoms.

5. A thermally stable polyacetal composition according to claim 4, in which the alkylene diamine used in the poly(amide-acetal) is hexamethylene tetramine.

6. A thermally stable polyacetal composition comprising a high molecular weight polymer of formaldehyde having a molecular weight in the range from about 10,000 to about 200,000 and a melting point in excess of 170° C. and containing a stabilizer system comprising (a) from about 0.01 to about 10 percent by weight of an antioxidant, and (b) from about 0.5 to about 20 percent by weight of a poly(amide-acetal) having a melting point in the range from about 150° C. to about 200° C. and a molecular weight in the range from about 1,000 to about 10,000, said poly(amide-acetal) being the polymeric product formed by reacting (i) a mixture of a cyclic acetal having the structural formula

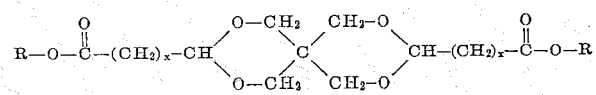

and a dicarboxylic acid compound having the structural formula

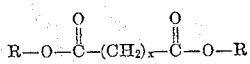

in both of which formulas R represents a member selected from the group consisting of hydrogen and alkyl groups having from 1 to 6 carbon atoms, and $x$ is an integer from 4 to 16, the mole ratio of cyclic acid to dicarboxylic acid compound in the mixture being in the range from about 1:10 to about 10:1, together with approximately stoichiometrically equivalent amounts of (b) an alkylene diamine having from 2 to 12 carbon atoms, all percentages being based on the weight of the formaldehyde polymer in the polyacetal composition.

7. A thermally stable polyacetal composition in accordance with claim 6, in which the antioxidant is an alkylene-bis-phenol having the structural formula

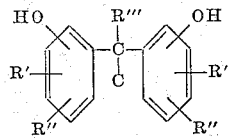

in which R' and R'' each represents an alkyl group having from 1 to 4 carbon atoms, and R''' represents a member selected from the group consisting of hydrogen and alkyl groups having from 1 to 3 carbon atoms.

8. A thermally stable polyacetal composition in accordance with claim 6, in which the antioxidant is 4,4'-butylidene-bis-(3-methyl-6-tert. butylphenol).

9. A thermally stable polyacetal composition in accordance with claim 6, in which the cyclic acetal used in the poly(amide-acetal) is 3,9-bis-(7-carbomethoxyheptyl)-2,4,8,10-tetraoxaspiro-[5,5]-undecane.

10. A thermally stable polyacetal composition in accordance with claim 6, in which the dicarboxylic acid compound used in the poly(amide-acetal) is dimethyl azelate.

11. A thermally stable polyacetal composition in accordance with claim 6, in which the alkylene diamine used in the poly(amide-acetal) is hexamethylene diamine.

12. A thermally stable polyacetal composition comprising a high molecular weight polymer of formaldehyde having a molecular weight in the range from about 10,000 to about 200,000 and a melting point in excess of 170° C. and containing a stabilizer system comprising (a) from about 0.1 to about 0.5 percent by weight of an alkylene-bis-phenol having the structural formula

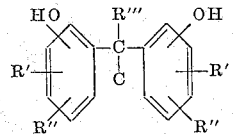

in which R' and R'' each represents an alkyl group having from 1 to 4 carbon atoms, and R''' represents a member selected from the group consisting of hydrogen and alkyl groups having from 1 to 3 carbon atoms, and (b) from about 0.5 to about 20 percent by weight of a poly(amide-acetal) having a melting point in the range from about 150° C. to about 200° C. and a molecular weight in the range from about 1,000 to about 10,000, said poly(amide-acetal) being the polymeric product formed by reacting (i) a mixture of 3,9-bis-(7-carbomethoxyheptyl)-2,4,8,10-tetraoxaspiro-[5,5]-undecane and dimethyl azelate in which the mole ratio of the cyclic acetal to dimethyl azelate is in the range from about 1:10 to about 10:1, together with approximately a stoichiometrically equivalent amount of (ii) hexamethylene diamine, all percentages being based on the weight of the formaldehyde polymer in the polyacetal composition.

References Cited by the Examiner

UNITED STATES PATENTS

| 3,161,619 | 12/1964 | Rice et al. | 260—78 |
| 3,223,683 | 12/1965 | Pryde | 260—78 |

MURRAY TILLMAN, *Primary Examiner.*

D. J. BREZNER, *Assistant Examiner.*